(12) United States Patent
Hotta

(10) Patent No.: US 8,828,276 B2
(45) Date of Patent: Sep. 9, 2014

(54) METAL NANOPARTICLE DISPERSION

(75) Inventor: Yasuyuki Hotta, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 264 days.

(21) Appl. No.: 13/041,599

(22) Filed: Mar. 7, 2011

(65) Prior Publication Data

US 2012/0091401 A1 Apr. 19, 2012

(30) Foreign Application Priority Data

Oct. 14, 2010 (JP) .................................. 2010-231901

(51) Int. Cl.
| | |
|---|---|
| *H01B 1/02* | (2006.01) |
| *C09D 11/00* | (2014.01) |
| *C22C 5/06* | (2006.01) |
| *B22F 1/00* | (2006.01) |
| *F01D 11/00* | (2006.01) |
| *C22C 9/00* | (2006.01) |
| *B82Y 30/00* | (2011.01) |

(52) U.S. Cl.
CPC . *C22C 5/06* (2013.01); *C09D 11/52* (2013.01); *B22F 1/0022* (2013.01); *F01D 11/00* (2013.01); *C22C 9/00* (2013.01); *B82Y 30/00* (2013.01); *Y10S 977/734* (2013.01); *Y10S 977/742* (2013.01); *Y10S 977/762* (2013.01)
USPC ........... 252/512; 252/502; 252/513; 252/514; 252/518.1; 252/519.2; 252/519.33; 252/521.1; 427/123; 445/24; 977/734; 977/742; 977/762

(58) Field of Classification Search
USPC .............. 252/512–514, 518.1, 519.2, 519.33, 252/502, 521.1; 445/24; 427/123; 977/734, 977/742, 762
See application file for complete search history.

(56) References Cited

U.S. PATENT DOCUMENTS

| 7,981,327 B2 * | 7/2011 | Sakaguchi et al. .......... 252/518.1 |
| 2004/0043691 A1 * | 3/2004 | Abe et al. .......................... 445/24 |
| 2009/0215410 A1 | 8/2009 | Cai et al. |
| 2009/0242854 A1 * | 10/2009 | Li et al. ..................... 252/519.33 |
| 2009/0274833 A1 * | 11/2009 | Li et al. .......................... 427/123 |
| 2010/0009071 A1 * | 1/2010 | Chopra et al. ................. 427/123 |

FOREIGN PATENT DOCUMENTS

| CN | 101085887 | 12/2007 |
| EP | 2 233 230 | 9/2010 |
| EP | 2 233 231 | 9/2010 |
| EP | 2233230 | 9/2010 |

(Continued)

OTHER PUBLICATIONS

Extended European Search Report for European Application No. 11157177.4 mailed on Nov. 2, 2011.

(Continued)

*Primary Examiner* — Khanh Tuan Nguyen
(74) *Attorney, Agent, or Firm* — Amin, Turocy & Watson, LLP

(57) ABSTRACT

According to one embodiment, metal nanoparticle dispersion includes organic solvent, and metal-containing particles dispersed in the organic solvent. The metal-containing particles include first metal nanoparticles and second metal nanoparticles. Each of the first metal nanoparticles has a high-molecular compound on at least part of a surface thereof. Each of the second metal nanoparticles has a low-molecular compound on at least part of a surface thereof. A total amount of the low-molecular compound on all of the second nanoparticles includes an amount of a primary amine as the low-molecular compound.

16 Claims, 4 Drawing Sheets

(56) References Cited

FOREIGN PATENT DOCUMENTS

| | | |
|---|---|---|
| EP | 2233231 | 9/2010 |
| JP | 2009-001883 | 1/2009 |
| JP | 2009-138243 | 6/2009 |
| JP | 2009-215503 | 9/2009 |
| JP | 2010-153118 | 7/2010 |
| JP | 2010-177084 | 8/2010 |

OTHER PUBLICATIONS

Korean Office Action mailed Jan. 30, 2013 for Korean Patent Application No. 10-2011-17143, 11 pages.

Jang, et al. "Nanosized Glass Frit as an Adhesion Promoter for Ink-Jet Printed Conductive Patterns on Glass Substrates Annealed at High Temperatures." Advanced Function Materials. 2008, 18, 2862-2868.

Lee, et al. "Direct synthesis and inkjetting of silver nanocrystals toward printed electronics." Nanotechnology, 17 (2006). Apr. 19, 2006. 2424-2428.

Chinese Office Action mailed Feb. 19, 2014 for Chinese Patent Application No. 201110050460.1 corresponding to U.S. Appl. No. 13/041,599, filed on Mar. 7, 2011.

Chinese Office Action for Chinese Patent Application No. 201110050460.1 mailed on Jul. 25, 2013.

Japanese Office Action for Japanese Patent Application No. 2010-231901 mailed on Jun. 10, 2014.

* cited by examiner

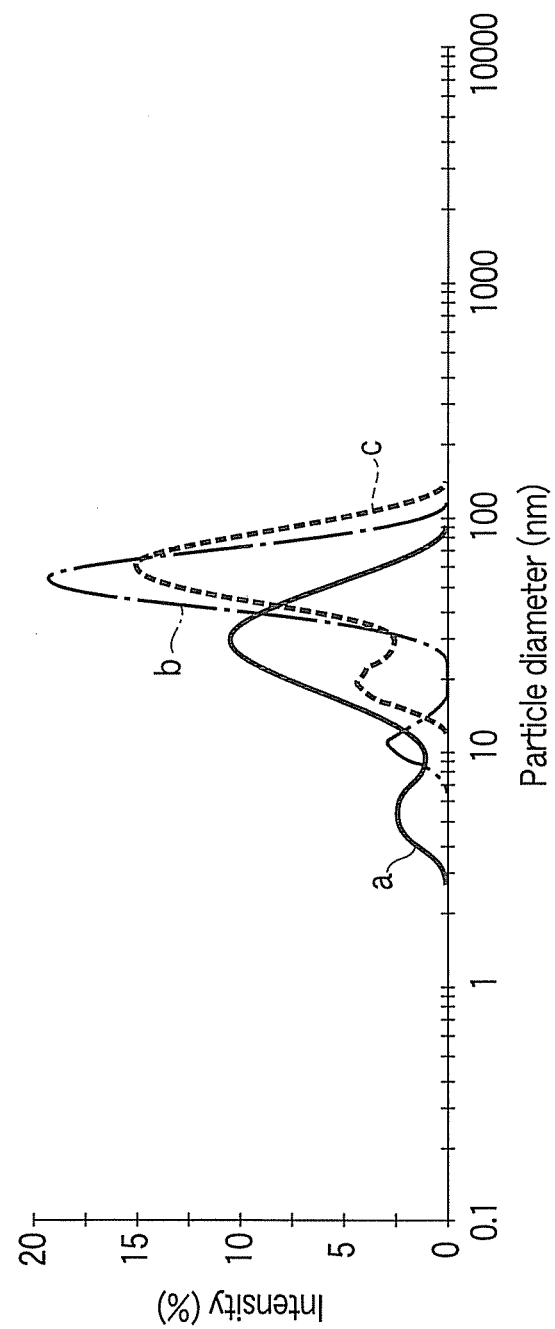
F I G. 1

METAL NANOPARTICLE DISPERSION

CROSS-REFERENCE TO RELATED APPLICATIONS

This application is based upon and claims the benefit of priority from Japanese Patent Application No. 2010-231901 filed on Oct. 14, 2010; the entire contents of which are incorporated herein by reference.

FIELD

Embodiments described herein relate generally to a metal nanoparticle dispersion.

BACKGROUND

Metal nanoparticles having a particle diameter of 100 nm or less are utilized as the major component of electronic wire-forming material. For example, JP-A 2010-177084 (KOKAI) proposes a method of producing metal nanoparticles superior in dispersing stability on an industrial scale.

In recent years, a method has been developed in which ink containing metal nanoparticles is jetted directly on a base material by an ink jet method to form an intended wire pattern. In the ink used in the ink jet method, it is required to disperse metal nanoparticles stably. Also, a film obtained by sintering of nanoparticles when the written pattern is baked needs to have good conductivity.

Gold nanoparticles and silver nanoparticles each have a surface which is scarcely oxidized. Ink containing such particles is used to write a circuit pattern, followed by baking, thereby enabling the formation of a highly conductive film. However, these gold nanoparticles and silver nanoparticles are expensive.

Copper nanoparticles are more inexpensive than gold nanoparticles and silver nanoparticles and also have high resistance to electro-migration. However, copper nanoparticles have poor dispersing stability in a solvent, so that they easily form aggregates. Moreover, when copper nanoparticles are baked to obtain a conductive film, it is necessary to bake them at higher temperatures than temperatures in the case of gold nanoparticles and silver nanoparticles. Also, because copper nanoparticles each have an easily oxidizable surface, they are baked in a reducing gas atmosphere. Because the obtained conductive film is not free from volumetric shrinkage along with the reduction of oxidizing components, good conductivity is not obtained.

BRIEF DESCRIPTION OF THE DRAWINGS

FIG. 1 is a graph showing the grain size distribution of a metal nanoparticle dispersion in an embodiment;

DETAILED DESCRIPTION

Figure 2:
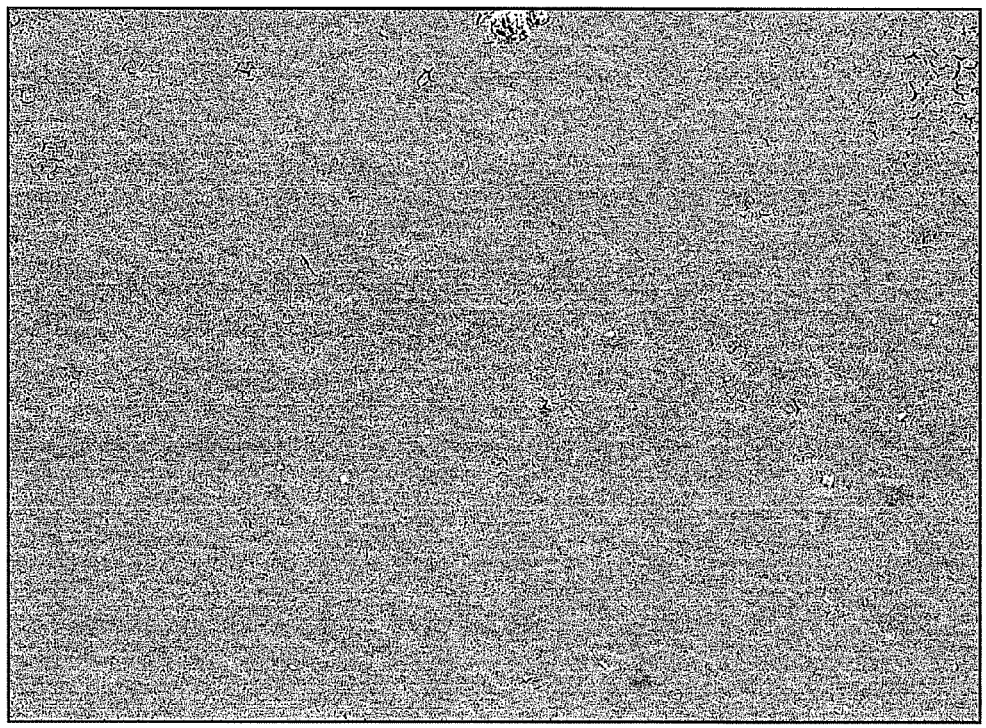
FIG. 2 is an SEM photograph of a conductive film formed using metal nanoparticle dispersion of an example.

In general, according to one embodiment, metal nanoparticle dispersion includes organic solvent, and metal-containing particles dispersed in the organic solvent. The metal-containing particles include first metal nanoparticles and second metal nanoparticles. Each of the first metal nanoparticles has a high-molecular compound on at least part of a surface thereof. Each of the second metal nanoparticles has a low-molecular compound on at least part of a surface thereof. A total amount of the low-molecular compound on all of the second nanoparticles includes an amount of a primary amine as the low-molecular compound.

An embodiment of the present invention will be explained.

In the metal nanoparticle dispersion of this embodiment, metal-containing particles are dispersed in an organic solvent. The metal-containing particles contain first metal nanoparticles and second metal nanoparticles.

The first metal nanoparticle contains a high-molecular compound having a weight average molecular weight of 1,000 or more on its surface. The high-molecular compound on the surface of the first metal nanoparticle protects this particle and acts as a dispersant improving dispersibility. Although a compound having the ability to coat the surface of the first metal nanoparticle may be used as the high-molecular compound, the entire surface of each of the first nanoparticles is unnecessarily coated closely with the high-molecular compound. If the high-molecular compound exists on at least a part of the surface of the first nanoparticles, a desired effect can be obtained. A high-molecular compound like this will be described later.

As the major component of the first metal nanoparticles, for example, a metal selected from the group consisting of copper, silver, gold, iron, platinum, palladium, tin, nickel, cobalt, ruthenium and rhodium may be used. The major component means that it accounts for 50% or more of the mass of the first metal nanoparticles. Among these metals, copper, silver, gold or platinum is preferable in view of a low volume resistivity and inexpensive copper is more preferable in consideration of costs.

Here, a method of producing copper nanoparticles will be explained taking the case where the major component is copper as an example. As the method of producing copper nanoparticles, two methods, that is, the breakdown method and buildup method are usually known.

When nanoparticles are produced by the breakdown method, a bulk or the like is milled by a milling machine such as a ball mill to produce nanoparticles. In this breakdown method, it is difficult to produce nano-order particles. On the other hand, the method of producing nanoparticles by the buildup method is a method for structuring nanoparticles from a metal atom. A buildup-based method is primarily used to produce nanoparticles. In this embodiment, nanoparticles produced by the buildup-based method are desirably used.

The method of producing nanoparticles by the buildup method is largely classified into a vapor-phase method, a liquid-phase method and a solid-phase method. Examples of the vapor-phase method include chemical methods including chemical vapor deposition (CVD) and physical methods including physical vapor deposition (PVD). Among these methods, for example, an in-gas vaporizing method and a heat plasma method have been recently developed as the physical methods which can synthesize a large amount of nanoparticles.

The liquid-phase method is a method of reducing copper ions contained in a soluble copper salt compound solution into copper atoms by using a reducing agent. Examples of the soluble copper salt compound include copper sulfate, copper nitrate, copper chloride and copper pyrophosphate. For example, sodium borohydride and hydrazine may be used as the reducing agent. According to this method, copper nanoparticles having a relatively narrow grain size distribution are obtained.

The solid-phase method is a method in which an organic metal complex compound containing copper is thermally decomposed to directly produce copper nanoparticles. Examples of the organic metal complex compound containing copper include copper β-ketocarboxylate and copper long-chain aliphatic carboxylate. Such a compound can be thermally decomposed by heating to about 100 to 300° C. in the presence of inert gas and a catalyst such as an amine compound.

In this embodiment, copper nanoparticles produced in any of the above methods may be used. In the liquid-phase method, nanoparticles are generally synthesized in an aqueous medium. When used, the aqueous medium is substituted with an organic solvent.

At least one selected from the group consisting of silver, gold, iron, platinum, palladium, tin, nickel, cobalt, ruthenium and rhodium may be contained in these nanoparticles. Such a metal has the ability to limit surface oxidation of copper nanoparticles.

The first metal nanoparticles may be constituted only of metals. Nanoparticles constituted only of metals are advantageous in the point that a highly conductive film is obtained after sintering. The metal in the case may be either a single metal or an alloy containing two or more metals. The first metal nanoparticles may be metal oxide particles if the content of oxygen is in a specified range. Nanoparticles containing a metal oxide have the merit that the dispersibility of particles is improved. Two or more of the first metal nanoparticles differing in structure from each other may be combined prior to use.

The second metal nanoparticles may be a metal oxide as will be described later. The metal nanoparticle dispersion of this embodiment is formed on a predetermined base material and baked to form a conductive film. In the case where excess oxygen exists in metal nanoparticles, the filming characteristics when a conductive film is obtained by sintering the metal nanoparticles are impaired. When the content of oxygen in the metal nanoparticles is 10% or less based on the total mass of the first metal nanoparticles and second metal nanoparticles, a conductive film can be formed without any troublesome work.

The content of oxygen in the first and second metal nanoparticles contained in the metal nanoparticle dispersion of this embodiment may be measured, for example, by the following method. First, only metal-containing particles are fractionated from the metal nanoparticle dispersion and dried by a vacuum drier or the like. The metal-containing particles here contain a high-molecular compound or low-molecular compound on their surfaces. After that, metal-containing particles are heated to 300 to 500° C. under a vacuum atmosphere with an oxygen concentration of 100 ppm or less to carbonize the high-molecular compounds on their surfaces to obtain metal nanoparticles. The heating of the metal-containing particles may be carried out in an atmosphere of inert gas such as argon or nitrogen. Finally, the metal-containing particles are subjected to infrared absorption analysis to find the content of oxygen in the metal nanoparticles.

When the primary particle diameter of the first metal nanoparticles is too large, these first nanoparticles differ in specific gravity from the second nanoparticles, causing vigorous sedimentation of the metal nanoparticles in the dispersion. In this case, there is a possibility that no stable dispersion is obtained. Here, with regard to the first and second metal nanoparticles, the term "primary particle diameter" means average primary particle diameter, which can be found, for example, by grain distribution measurement utilizing the dynamic light scattering method.

When the primary particle diameter of the first and second metal nanoparticles is too small on the other hand, a large amount of a dispersant is required to maintain the state of dispersion. When a large amount of dispersant is contained in the dispersion, the volume shrinkage of the film in the baking is increased and there is a possibility that a high-quality film is not obtained. When noble metals such as gold, silver and platinum are contained in the first or second metal nanoparticles, the surface activity of the particles is increased, bringing about accelerated surface oxidation if the primary particle diameter is too small. As a result, there is a possibility as to a large deterioration in conductivity after the formation of metal wires.

If the metal nanoparticles having a primary particle diameter range of 10 to 100 nm are used, they have none of these drawbacks. The maximum particle diameter of the first metal nanoparticles is preferably 500 nm or less and particularly preferably 200 nm or less. The maximum particle diameter of the metal nanoparticles means a grain size including those of coagulated particles and can be found by the aforementioned grain size distribution measurement.

In an example, the proportion of particles having a primary particle diameter of 200 nm or more in the first metal nanoparticles is preferably 5% or less and more preferably 1% or less based on the mass of the metal (or metal component). When particles having a primary particle diameter of 200 nm or more are increased, a wire having a uniform resistance is formed with difficulty and there is a possibility as to disorders such as clogging of a nozzle. In this case, dispersion diameter means the particle diameter of the metal nanoparticles when these metal nanoparticles exist in the metal nanoparticle dispersion. The average dispersion diameter of the metal nanoparticles may be found, for example, by grain distribution measurement utilizing the dynamic light scattering method.

The first metal nanoparticles as mentioned above are provided with a high-molecular compound having a weight average molecular weight of 1,000 or more on their surfaces. The high-molecular compound on the surface of the first metal nanoparticles protects these particles and acts as a dispersant improving dispersing stability.

In an example, the high-molecular compound contains two or more functional groups or atoms participating in the adsorption to the surface of the first metal nanoparticles. The functional groups or atoms to be used are those which have physical or chemical affinity to the surface of the first nanoparticles or which are combined with the first metal nanoparticles by ion bonds or coordinate bonds to thereby stabilize the adsorption of these metal nanoparticles to the surface of the metal.

The high-molecular compound preferably contains two or more functional groups or atoms having such a nature in its structure. Even if a part of the functional group or the like which adsorbs to the surface of the first metal nanoparticles is released, the same functional groups or atoms existing in the high-molecular compound or functional groups or atoms which interact with a metal adsorb to the surface of the first metal nanoparticles. Because the high-molecular compound always exists on the surface of the first metal nanoparticles, good dispersing stability is exhibited.

Any high-molecular compound may be used without any particular limitation insofar as it can exist on the surface of the first metal nanoparticles. As the high-molecular compound, those having a functional group having an unshared electron pair in a repeat unit are preferable. Examples of these functional groups include functional groups containing a nitrogen atom, oxygen atom or sulfur atom.

Examples of the group containing a nitrogen atom include an amino group, amide group, nitrile group, imine, oxime, and nitro group. Also, examples of the group containing an oxygen atom include a hydroxy group, carboxyl group, ketone, ester and ether-type oxy group (—O—). Examples of the group containing a sulfur atom include a sulfanyl group (—SH) and sulfide type sulfanediyl group (—S—). The high-molecular compound may include a single functional group. Alternatively, two or more functional groups different from each other may be contained in the high-molecular compound.

Specific examples of these high-molecular compounds include polyvinyl types such as a polyvinyl alcohol and polyvinyl pyrrolidone; polyalkylene glycols such as a polyethylene glycol; polyacrylic acids such as a polyacrylic acid, polymethacrylic acid, and polymaleic acid; sodium salts of polyacrylic acids; potassium salts of polyacrylic acids; ammonium salts of polyacrylic acids; natural polymers such as starch, dextrin, agar, gelatin, gum arabic, alginic acid, casein, and sodium caseinate; celluloses such as methyl cellulose, ethyl cellulose, hydroxyethyl cellulose and carboxymethyl cellulose.

Furthermore, nitrogen-containing high-molecular compounds containing an amino group may also be used. Examples of these high-molecular compounds include polyether polyamines such as a polyoxyethylene polyamine and polyallylamines.

In high-molecular compounds like those mentioned above, it is required that a group containing an atom having an unshared electron pair exists in at least a part of repeat units. Even if a repeat unit not containing such a group exists in the high-molecular compound, it is no problem. In other words, the high-molecular, compound may be a copolymer.

The copolymer in this case may be a random copolymer, alternate copolymer, block copolymer or comb copolymer. There is no particular limitation to the structure of the block copolymer may have a di-block structure or tri-block structure. The structure of the block copolymer may be properly selected according to, for example, the functional group coordinated with the surface of the metal nanoparticles and the solvent to be dispersed.

The high-molecular compound may be synthesized by usual methods. Alternately, compounds which are commercially available as polymer dispersants may be used. Specific examples of commercially available polymer dispersants include Solsperse series such as Solsperse 20000, 24000, 26000, 27000, 28000 and 55000 (manufactured by Avecia Biologics Limited). Ajisper series such as Ajisper PB711, PA111, PB811, PB821 and PW911 (manufactured by Ajinomoto Co., Inc.) is also preferable as the polymer dispersant.

The weight average molecular weight of the high-molecular compound as mentioned above is limited to 1,000 or more. This is to improve the dispersibility of the first metal nanoparticles. When the weight average molecular weight of the high-molecular compound is less than 1,000, coagulation among particles arises in relation to the second metal nanoparticles which will be described later, causing impaired storage stability. The weight average molecular weight of the high-molecular compound is preferably 3,000 or more.

When the weight average molecular weight of the high-molecular compound is too large, there is a possibility that the high-molecular compound is crosslinked, bringing about coagulation between neighboring particles. Generally, the upper limit of the weight average molecular weight of the high-molecular compound is about 100,000. The weight average molecular weight of the high-molecular compound is more preferably in a range of 3,000 to 100,000.

The weight average molecular weight of the high-molecular compound on the first nanoparticles in the metal nanoparticle dispersion of this embodiment may be found, for example, by the following method. First, the first metal nanoparticles are selectively taken out of the metal nanoparticle dispersion by a centrifugal separator or the like. The first metal nanoparticles have the high-molecular compound on their surfaces. Here, even if the second metal nanoparticles are mixed, this gives rise to no problem. Then, the first metal nanoparticles are refluxed in a polar solvent to extract an organic compound including the high-molecular compound on the surface of each particle. Here, if a metal such as Cu which is easily soluble in an acid is contained, the organic compound can be easily extracted by dissolving the first metal nanoparticles in the acid. The obtained organic compound is re-dissolved in tetrahydrofuran and subjected to a gel permeation chromatograph (trade name: 10A series, manufactured by Shimadzu Corporation) to find the weight average molecular weight based on a polystyrene calibration curve of a known molecular weight which has been made in advance.

The first metal nanoparticles having the high-molecular compound on their surfaces may be produced by an optional method. When the first metal nanoparticles are produced for example, by a wet method, a desired high-molecular compound may be added in advance in a solution containing an organic metal compound and a reducing agent.

Specifically, a desired high-molecular compound is added in a flask with pure water contained therein to prepare an aqueous solution. To the above aqueous solution is added an aqueous metal salt solution including a metal nitrate or acetate with stirring and the mixture is raised to a predetermined temperature. After that, a reducing agent is added to the mixture, which is then stirred continuously to obtain an aqueous solution which is to be starting material. In succession, the aqueous solution is washed and then, alcohol is poured into the solution to coagulate particles, which are then collected and dried. The dried particles are dispersed in a desired organic solvent to obtain a metal nanoparticle dispersion Also, in the case of producing the first metal nanoparticles by a physical vapor-phase method, nanoparticles are brought into contact with vapor of an organic compound having a low molecular weight in the course of producing the nanoparticles. Here, "low molecular weight" means a molecular weight of about 100 to 500.

The contact with the vapor like this enables the production of nanoparticles while coating with an organic compound preventing the coagulation among nanoparticles. When these nanoparticles are dipped in a solution in which a desired high-molecular compound is dissolved, the nanoparticles coated with the low-molecular organic compound are further coated with the high-molecular compound to obtain the first metal nanoparticles.

When producing nanoparticles containing copper as a major component, anti-oxidation treatment is sometimes carried out for example, by forming a eutectoid with a noble metal element or introducing methane gas or the like to undergo carbon coating. The surface of copper nanoparticles which have been subjected to anti-oxidation treatment may be coated with the high-molecular compound.

In the metal nanoparticle dispersion according to this embodiment, the second metal nanoparticles are contained together with the first metal nanoparticles mentioned above. Each of the second metal nanoparticles is provided with a low-molecular compound having a weight average molecular weight of 500 or less on at least a part of their surfaces. A total amount of low-molecular compound on all of the second metal nanoparticles comprises an amount of a primary amine as the low-molecular compound.

The low-molecular compound on the surface of the second metal nanoparticles protects the second metal nanoparticles to improve the dispersibility of the second metal nanoparticles in the metal nanoparticle dispersion. When a film containing the metal nanoparticle dispersion is baked, the low-molecular compound is easily released from the surface of the second metal nanoparticles and vaporized from the film. The surface of the second metal nanoparticles can be coated with the low-molecular compound. It is however unnecessary that the whole surface of each of the second metal nanoparticles is closely coated with the low-molecular compound. If the low-molecular compound exists on at least a part of the surface of each of the second metal nanoparticles, a desired effect can be obtained. Such a low-molecular compound will be explained later.

Similarly to the first metal nanoparticles, the major component of the second metal nanoparticles may be a metal selected from the group consisting of copper, silver, gold, iron, platinum, palladium, tin, nickel, cobalt, ruthenium and rhodium. As mentioned above, the low-molecular compound on the surface of the second metal nanoparticles is easily released from the surface of the second metal nanoparticles by baking treatment. Because the second metal nanoparticles are exposed to an oxidizing atmosphere, the major component of the second metal nanoparticles is preferably a metal having a high redox potential. Specific examples of the metal include a noble metal selected from the group consisting of silver, gold, palladium, and platinum. Silver is particularly preferable as the major component of the second metal nanoparticles because the effect of dropping the melting point due to the sizing effect obtained when nanoparticles are formed is large.

Similarly to the first metal nanoparticles, the second metal nanoparticles are also constituted only of a metal. The metal in this case may be either a single metal or an alloy containing two or more metals. If the aforementioned condition of oxygen content is satisfied, the second metal nanoparticles may be metal oxide particles. Moreover, two or more of the second metal nanoparticles differing in structure may be combined prior to use.

From the same reason as in the case of the first metal nanoparticles, the primary particle diameter of the second metal nanoparticles is desirably designed to be in a range of 10 to 100 nm. Like the case of the first metal nanoparticles, the maximum particle diameter of the second metal nanoparticles is also preferably 500 nm or less and more preferably 200 nm or less. In an example, the proportion of particles having a primary particle diameter of 200 nm or more is preferably 5% or less and more preferably 1% or less based on the mass of the metal or metal content from the same reason as in the case of the first metal nanoparticles.

The second metal nanoparticles as mentioned above are provided with a low-molecular compound having a molecular weight of 500 or less on their surfaces. The compound having a molecular weight exceeding 500 has a high boiling point. Even if the low-molecular compound is released from the surface of the nanoparticles by the baking treatment, it remains in the film, and as a result, there is a possibility that it adversely affects the electric characteristics of the film. The molecular weight of the low-molecular compound on the surface of the second metal nanoparticles is limited to 500 or less in order to avoid such a disorder.

The low-molecular compound having a too small molecular weight is thermally unstable and has a high vapor pressure. Such a compound is easily released from the surface of the metal nanoparticles, with the result that this is a cause of disorders such as coagulation of the nanoparticles among them. The molecular weight of the low-molecular compound is made to be desirably about 60 or more. The molecular weight of the low-molecular compound is therefore preferably 60 to 500 and more preferably 100 to 300.

The molecular weight of the low-molecular compound on the second metal nanoparticles in the metal nanoparticle dispersion in this embodiment may be found by the following method. First, the second metal nanoparticles are selectively taken out of the metal nanoparticle dispersion by a centrifugal machine or the like. The second metal nanoparticles are provided with the low-molecular compound on their surfaces. Here, even if the first metal nanoparticles are mixed, this is no problem. When the second metal nanoparticles comprise a metal, such as Cu, which is easily soluble in an acid, the low-molecular compound can be separated/recovered easily by dissolving the particles in the acid.

Then, the resulting solution is refluxed in a polar solvent to extract an organic compound including the low-molecular compound on the surface of the particles. A known mass spectrum analysis and a known nuclear magnetic resonance (NMR) analysis of the obtained organic compound are performed to obtain the molecular weight and structure of the low-molecular compound.

Even if the separation of the high-molecular compound from the low-molecular compound is difficult in the extraction operation of the organic compound, a low-molecular organic compound can be extracted when a fractionating operation is carried out by known high-performance liquid chromatography (HPLC) after the organic compound is extracted by the above manner.

In an example, the low-molecular compound contains a functional group or atom which interacts with the second metal nanoparticles. Examples of the atom include oxygen, nitrogen and sulfur having an unshared electron pair. Also, examples of the functional group containing these atoms include functional groups such as an amino group, carboxyl group, hydroxyl group, ether-type oxy group, thiol group and sulfide group (—S—). The low-molecular compounds to be used may contain one or a combination of two or more of these functional groups.

A primary amine is contained in the low-molecular compound of all the second metal nanoparticles. The low-molecular compound containing a primary amine coordinates firmly with the surface of the second metal nanoparticles and therefore, the dispersing stability of the second metal nanoparticles in the metal nanoparticle dispersion is remarkably improved. The present inventors have found that a primary amine has the ability to bind more highly with a metal than secondary or tertiary amines.

Examples of the primary amine include alkyl amines. An alkyl amine having an excessively low boiling point is thermally unstable and has a high vapor pressure. An alkyl amine having an excessively low boiling point is easily released though it coordinates with the surface of the second nanoparticles and there is a possibility as to coagulation among nanoparticles. If an alkyl amine has a boiling point of 50° C. or more, such disorders can be avoided. The boiling point of the alkyl amine is more preferably 100° C. or more.

It is required that the low-molecular compound on the surface of the second metal nanoparticles be released from the surface of the second metal nanoparticles after baking treatment and finally vaporized together with a dispersion medium. If the boiling point of the alkyl amine is 250° C. or less, the above requirement is easily satisfied.

The number of carbons of the alkyl group in the alkyl amine is preferably 4 to 12 in consideration of the boiling point mentioned above. An alkyl amine in which an amino group is bonded to the terminal of the alkyl chain is preferably used. Specific examples of the alkyl amine include propylamine, butylamine, hexylamine, octylamine, nonylamine, decylamine, hexadecylamine, dodecylamine and oleylamine.

If a primary amine is contained, a secondary amine and tertiary amine may be further contained. Also, a compound such as 1,2-diamine and 1,3-diamine in which two or more neighboring amino groups participate in bonding may be utilized. Also, a chain amine compound containing a polyoxyalkyleneamine type ether-type oxy group in its chain may also be used.

Hydrocarbons other than saturated hydrocarbons may be contained in the alkyl chain part in a primary amine. Examples of the hydrocarbons include unsaturated hydrocarbons, alicyclic hydrocarbons and aromatic hydrocarbons. Also, a hydrophilic terminal group may exist other than the terminal amino group. For example, a hydroxylamine having a hydroxyl group, for example, ethanolamine may be utilized.

Examples of the low-molecular compound include carboxyl group-containing compounds and compounds having a carboxylic acid at the terminal may be utilized. Examples of the carboxylic acid include monocarboxylic acids, polycarboxylic acids and oxycarboxylic acids.

Examples of the monocarboxylic acids include aliphatic monocarboxylic acids having 1 to 24 carbon atoms such as acetic acid, propionic acid, butyric acid, valeric acid, caprylic acid, caproic acid, capric acid, lauric acid, myristic acid, palmitic acid, stearic acid, arachidic acid, behenic acid, and lignoceric acid.

Also, unsaturated aliphatic carboxylic acids having 4 to 24 carbon atoms such as oleic acid, linoleic acid, α-linoleic acid, γ-linoleic acid, dihomo-γ-linoleic acid, elaidic acid, arachidonic acid, erucic acid, nervonic acid, stearidonic acid, eicosapentaenoic acid, and docosahexaenoic acid. Moreover, aromatic monocarboxylic acids having 7 to 12 carbon atoms such as benzoic acid and naphthoic acid may also be used.

Examples of the polycarboxylic acids include aliphatic polycarboxylic acids having 2 to 10 carbon atoms such as oxalic acid, malonic acid, succinic acid, glutaric acid, adipic acid, azelaic acid, and sebacic acid; aliphatic unsaturated polycarboxylic acids having 4 to 14 carbon atoms such as maleic acid, fumaric acid, itaconic acid, sorbic acid, and tetrahydrophthalic acid; and aromatic polycarboxylic acids such as phthalic acid and trimellitic acid.

Examples of the oxycarboxylic acids include aliphatic hydroxymonocarboxylic acids such as glycolic acid, lactic acid, oxybutyric acid, and glyceric acid; aromatic hydroxymonocarboxylic acids such as salicylic acid, oxybenzoic acid, and gallic acid; and hydroxypolycarboxylic acid such as tartaric acid, citric acid and malic acid.

Particularly, relatively low-molecular saturated aliphatic carboxylic acids having one free carboxyl group in one molecule are preferable. Such a carboxylic acid coordinates with the surface of the metal nanoparticles and is stable when it exists in an ambient atmosphere in the dispersion. When this carboxylic acid is baked at a predetermined temperature, it releases or disappears from the second metal nanoparticles, leading to improvements in the film-forming characteristics and conductivity of the conductive film.

Specific examples of these carboxylic acids include alkanoic acids having 5 to 13 carbon atoms such as valeric acid, caprylic acid, caproic acid, capric acid, lauric acid and myristic acid.

Specific examples of the compound having a hydroxy group may include alkane diols. Examples of the alkane diols may include glycols such as ethylene glycol, diethylene glycol, and polyethylene glycol.

The alkane diol also desirably coordinates with the surface of the second metal nanoparticles and is stable when it exists in an ambient atmosphere in the dispersion, and when it is baked at a predetermined temperature, it releases or disappears from the second metal nanoparticles. Taking this into account, the boiling point of the alkane diol is preferably 50 to 250° C. and more preferably 100 to 150° C. For example, a compound such as a 1,2-diol type in which two or more hydroxy groups participate in boding satisfies this requirement and is more preferable.

Examples of the compound having a thiol group may include alkane thiols. The alkane thiol which is also desirably used likewise coordinates with the surface of the second metal nanoparticles and is stable when it exists in an ambient atmosphere in the dispersion, and when it is baked at a predetermined temperature, it releases or disappears from the second metal nanoparticles.

Taking this into account, the boiling point of the alkane thiol preferably 50 to 250° C. and more preferably 100 to 150° C. As the alkane thiol, for example, compounds each having an alkyl group having 4 to 18 carbon atoms and a thiol group at the terminal of the alkyl chain are used. A compound such as a 1,2-dithiol type in which two or more thiol groups participate in boding can be utilized.

The second metal nanoparticles provided with a low-molecular compound on at least part of a surface thereof may be produced by an arbitrary method. When the second metal nanoparticles are produced, for example, by a wet method, a desired low-molecular compound may be added in advance in a solution containing an organic metal compound and a reducing agent. Also, when the second metal nanoparticles are produced by a physical vapor-phase method, nanoparticles are brought into contact with vapor of a desired organic compound having a low molecular weight in the course of producing the nanoparticles. In the case of adopting any of these methods, the second metal nanoparticles having a predetermined low-molecular compound on their surfaces can be easily produced.

The low-molecular compound existing on the surface of the second metal nanoparticles in the metal nanoparticle dispersion of this embodiment may be easily identified by a known heat analysis and mass spectrum analysis. Also, even in the case of a composition mixed with the first metal nanoparticles with the high-molecular compound on at least part of a surface thereof, the low-molecular compound can be identified. First, the high-molecular compound is identified by the method mentioned above to exclude these fragments, thereby identifying the low-molecular compound on the surface of the second metal nanoparticles.

Here, a method of producing the second metal nanoparticles by using a fatty acid metal compound as the organic metal compound according to a wet method will be explained. In the case of producing silver nanoparticles provided with a low-molecular compound on their surfaces, first, sodium fatty acid ester is dissolved in distilled water. Here, if an equivalent amount of an aqueous silver nitrate solution separately prepared is added dropwise to the above solution, powdery fatty acid silver is easily obtained. Examples of the sodium fatty acid ester include sodium laurate. The obtained powder is separated by filtration and washed with water to remove surplus sodium laurate and by-produced sodium nitrate. The obtained nanoparticles are dried to obtain object second nanoparticles.

The fatty acid may include any of saturated hydrocarbons, unsaturated hydrocarbons and cyclic hydrocarbons. An arbitrary fatty acid may be used as long as it has a weight average molecular weight of 500 or less. These fatty acids tend to be deteriorated in solubility in distilled water with increase in the number of carbons contained in the hydrocarbon group. In this case, if the solubility is properly adjusted by adding, an alcohol and the like, there is no problem.

The obtained fatty acid silver and 0.5 to 1.5 equivalents of alkyl amine is added together with a reducing agent as required to an organic solvent. Examples of the reducing agent include formic acid and hydrazine. As the organic solvent, for example, toluene may be used. Object second metal nanoparticles are produced by reacting at the boiling point of the alkyl amine.

The obtained second metal nanoparticles generally contain two types of materials, that is, fatty acid having a weight average molecular weight of 500 or less and an alkyl amine. In other words, second metal nanoparticles provided with a low-molecular compound containing a primary amine on their surfaces are obtained.

The amine to be used, any amine may be used as long as it contains at least a primary amine having a boiling point of 250° C. or less as mentioned above. A plurality of alkyl amines may be used corresponding to reactivity and yield.

When methanol is added to the obtained silver nanoparticle dispersion solution, silver nanoparticles provided with the low-molecular compound on their surfaces can be coagulated and precipitated. Only nanoparticles are taken out in this manner and then dispersed in a desired solvent, enabling the preparation of a dispersion.

However, these methods are only examples and embodiments are not limited to these methods. Any method may be adopted as long as the second metal nanoparticles having a low-molecular compound having a weight average molecular weight of 500 or less on at least part of a surface thereof are obtained and a primary amine is contained in all amount of the low-molecular compound. An optional method which can attain this object may be used.

The proportion of the primary amine in the low-molecular compound is optionally controlled according to, for example, production conditions without any particular limitation. For example, the proportion of the primary amine may be designed to be 5% or more based on the amount of the low-molecular compound. The primary amine is unnecessarily contained in the low-molecular compound on the surface of each of all the second metal nanoparticles. It is only necessary to contain the primary amine in the low-molecular compound on the surface in at least a part of the second metal nanoparticles. There is the case where a second metal nanoparticle in which the low-molecular compound on the surface is all constituted of the primary amine exists depending on the case. Also, there is the case where a second metal nanoparticle provided with the low-molecular compound containing no primary amine on the surface exists.

The presence of the primary amine in the low-molecular compound on the second metal nanoparticles in the metal nanoparticle dispersion in this embodiment can be confirmed, for example, by the following method. Specifically, as mentioned above, a metal nanoparticle component is fractionated from the metal nanoparticle dispersion, for example, by a centrifugal operation. Then, the second metal nanoparticles are refluxed in a polar solvent to extract an organic compound including the low-molecular compound on the surface of each particle.

The obtained organic compound is analyzed by a known IR analysis or NMR analysis to find the proportion of the primary amine. In order to find the proportion of the primary amine in the low-molecular compound, such a measure as to compare the compositional ratio of the primary amine to other organic compounds from the peak in, for example, NMR analysis obtained in the above method.

In the metal nanoparticle dispersion of this embodiment, metal nanoparticles are stably dispersed in an organic solvent. When the carbon number of the organic solvent is too large, there is a possibility as to increase in the viscosity of the metal nanoparticle dispersion. Also, such a problem arises that carbon tends to remain in the baked film. The residual carbon causes disorders such as a reduction in the conductivity of the obtained baked film and generation of defects in the film. When the number of carbons in the organic solvent is 18 or less, such a problem can be avoided.

An organic solvent having a too small carbon number is easily vaporized and is therefore rapidly dried. When the metal nanoparticle dispersion is applied to ink jet printing, the drying of the organic solvent is a cause of defects such as clogging of nozzles. If the number of carbons of the organic solvent is 8 or more, the organic solvent is dried at an appropriate speed.

The following organic solvents are preferable in this embodiment taking these factors into account. Specific examples of the organic solvent include long-chain alkanes such as heptanes, octane, decane, undecane, dodecane, tridecane, and trimethylpentane; cyclic alkanes such as cyclooctane; aromatic hydrocarbons such as toluene, xylene, trimethylbenzene and dodecylbenzene; alcohols such as heptanol, octanol, decanol, cyclohexanol and terpineol; ethylene glycol type ethers such as diethylene glycol diethyl ether, diethylene glycol monobutyl ether, diethylene glycol dibutyl ether, ethylene glycol monopropyl ether, triethylene glycol dimethyl ether, triethylene glycol monobutyl ether, triethylene glycol monomethyl ether and dipropylene glycol methyl ether; and acetate compounds of these ethylene glycol type ethers.

These solvents may be used either singly or in combinations of two or more. The solvent may be, for example, a mineral spirit which is a mixture of long-chain alkanes.

The metal nanoparticle dispersion in this embodiment may be produced by preparing the first metal nanoparticles and the second metal nanoparticles and dispersing these nanoparticles in a predetermined organic solvent. Alternatively, a dispersion in which the first metal nanoparticles are dispersed in a predetermined organic solvent and a dispersion in which the second metal nanoparticles are dispersed in a predetermined organic solvent are prepared in advance. The metal nanoparticle dispersion may be produced by mixing these two dispersions.

When the concentration of the metal-containing particles in the metal nanoparticle dispersion is too low, the density of the metal-containing particles in the printed pattern is insufficient, bringing about insufficient conductivity. When the concentration of the metal-containing particles in the metal nanoparticle dispersion is too high, on the other hand, there is a possibility as to defects such as a rise in the viscosity of the dispersion.

When the concentration of the metal-containing particles in the metal nanoparticle dispersion is 1 to 90 mass %, such a defect can be avoided. Particularly, when the concentration of the metal-containing particles is 4 to 70 mass %, this is preferable in the point of the stability of liquid droplets and drying characteristics of the liquid droplets when they are jetted in printing using ink jet.

In the metal nanoparticle dispersion of this embodiment, the first metal nanoparticles having the high-molecular compound on their surfaces are desirably contained in a larger amount than the second metal nanoparticles having the low-molecular compound on their surfaces. When the second metal nanoparticles are contained in almost the same amount as the first metal nanoparticles, coagulation among metal nanoparticles tends to proceed. This is because the coating stability of the low-molecular compound with the nanoparticles is deteriorated only by applying some energy such as temperature or other flowing action. When the amount of the second metal nanoparticles is increased, this tendency is significant, with the result that there is a possibility that the dispersing stability of the metal nanoparticles in the dispersion cannot be maintained.

For example, the first and second metal nanoparticles are preferably formulated such that the amount of the second metal nanoparticles (w2) is about 0.1 to 30% of the amount of the first metal nanoparticles (w1).

The proportion of the high-molecular compound on the surface of the first metal nanoparticles and the proportion of the low-molecular compound on the surface of the second metal nanoparticles can be measured by a usual method. Examples of the usual method include thermal analysis and more specifically a thermal mass/differential heat simultaneous analysis. For example, the proportions of these compounds can be measured by analyzing gas transpired at a temperature up to 250° C. in an inert gas atmosphere such as a nitrogen or argon atmosphere or under vacuum.

Besides the aforementioned components, a surfactant, a viscosity adjusting agent and the like may be added to the metal nanoparticle dispersion of this embodiment properly without any problem. As the surfactant, any of anionic type, cationic type and nonionic type surfactants may be used. A proper surfactant is selected and added in consideration of the wettability of a circuit substrate on which metal wires are to be formed. Examples of the viscosity regulating agent include polymers such as a polyethylene glycol. When the metal nanoparticle dispersion of this embodiment is used as an ink jet ink, the ink can be adjusted to a viscosity range where the ink can be jetted by using the polymer.

The metal nanoparticle dispersion of this embodiment can be produced by blending the aforementioned components. In order to disperse the metal nanoparticles in an organic solvent, a method may be adopted in which for example, a beads mill, rocking mill, or homogenizer is used to disperse these components by mechanical impact or shear. Also, a method may also be used in which the metal nanoparticles are dispersed by cavitation force of an ultrasonic wave or high-pressure homogenizer. Among these methods, dispersing techniques using an ultrasonic machine and especially ultrasonic homogenizer are more preferable. This is because the contamination with impurities is smaller in the ultrasonic measures than mechanical impact and shear of a mill or the like.

When the metal nanoparticles are dispersed by applying an ultrasonic wave, the frequency is preferably in a range of 2 to 100 kHz. The frequency is more preferably in a range of 2 to 50 kHz and even more preferably in a range of 10 to 40 kHz. The ultrasonic wave may be continuously applied. When ultrasonic wave is continuously applied for a long time, the particles are heated and there is a possibility that it adversely affects the dispersibility. Therefore, when the time for the application is long, the application of ultrasonic wave is preferably intermittent. Also, the heat caused by the continuous and long-time application can be limited by cooling the dispersion.

The ultrasonic applying machine preferably has a function of applying ultrasonic wave of a frequency of 10 kHz or more. Examples of the ultrasonic applying machine include an ultrasonic homogenizer and ultrasonic washing machine. When the temperature of the dispersion is raised during application of ultrasonic wave, the nanoparticles are thermally coagulated. To avoid this, the temperature of the solution is preferably 0 to 100° C. and more preferably 5 to 60° C. The temperature of the solution may be controlled by controlling the temperature of the dispersion. Alternatively, the temperature may be controlled by controlling the temperature of a temperature regulating layer used to control the temperature of the dispersion.

The metal nanoparticle dispersion in this embodiment is preferably used to form a conductive film. As the base material, a silicon substrate; metal substrates using Cu, Au, Ag, or the like; ceramics such as alumina and silica glass; and plastics such as an epoxy resin, polyimide resin, and PET resin may be used. The metal nanoparticle dispersion of this embodiment is applied to the surface of the base material by the spin coating method to form a coated film.

When the object conductive film is metal wire having a prescribed pattern, the printing method such as the ink jet method may be utilized. As is already explained, the metal nanoparticle dispersion of this embodiment has the characteristics suitable for the ink jet method because the metal nanoparticles are stably dispersed in the metal nanoparticle dispersion.

The coated film of the metal nanoparticle dispersion, for example, is dried at a temperature close to the boiling point of an organic solvent used as a solvent for about 1 to 10 minutes to remove an organic solvent, thereby forming a metal nanoparticle dispersion film. Then, the metal nanoparticle dispersion film is subjected to baking treatment. Specifically, baking treatment is carried by baking the coated film at 150 to 250° C. for about 1 to 30 minutes in a nitrogen atmosphere containing 1 ppm to 30% of oxygen and then, by baking the coated film at 200 to 300° C. for about 1 to 60 minutes in a nitrogen atmosphere containing at least 1% of hydrogen, thereby obtaining a conductive film which is sufficiently reduced in volume resistivity and has good conductivity.

Specific examples of the metal nanoparticle dispersion will be explained.

Example 1

First, a dispersion of first metal nanoparticles containing a high-molecular compound on their surfaces was produced.

As silver nanoparticles, 50 g of silver nanoparticles (Nisshin Engineering Co., Ltd.) manufactured by the heat plasma method was prepared. These silver nanoparticles had a primary particle diameter of about 30 nm which was observed by SEM and a BET specific surface area of 45 $m^2/g$.

A polyvinyl pyrrolidone (weight average molecular weight: 50,000) was prepared as a high-molecular compound. 2.5 g of this high-molecular compound, 85 g of ethylene glycol monoethyl ether acetate and 10 g of undecane were mixed with the aforementioned silver nanoparticles. The obtained mixture was simply stirred by a rolling mill and then, dispersed by an ultrasonic homogenizer. The condition of the ultrasonic wave was as follows: frequency is 20 kHz, and power is about 3 W.

After the dispersion solution was allowed to pass through a three-roll mill, ultrasonic homogenizing treatment was again treated in the same condition to obtain a dispersion of silver nanoparticles having polyvinyl pyrrolidone on their surfaces. This is a dispersion of first metal nanoparticles with a high-molecular compound on their surfaces. Also, the obtained dispersion was evaluated by grain size distribution measurement (trade name: Zeta Nanosizer, manufactured by Malvern Instruments Ltd.) according to the dynamic light scattering method, to find that the nanoparticles had an average particle diameter of 38 nm and a maximum particle diameter of 100 nm or less.

On the other hand, second metal nanoparticles having a low-molecular compound on their surface were produced by the following method. Sodium laurate and silver nitrate were mixed in equivalent amounts to synthesize silver laurate by ion exchange. The obtained silver laurate (30 g) and hexylamine (9.9 g) as a primary amine were dissolved in xylene (200 mL) to obtain a solution. The boiling point of this hexylamine was about 131° C.

The temperature of this solution was raised to 130° C. and kept at this temperature for 5 hours. When the temperature of the solution was dropped to 60° C., the production of silver nanoparticles was confirmed. Methanol (500 mL) was added to the solution to coagulate silver nanoparticles, and then the coagulated silver nanoparticles were collected by suction filtration. The yield of the obtained silver nanoparticles was 73%. Also, the primary particle diameter of these silver nanoparticles observed by SEM was about 20 nm. Also, the obtained dispersion containing the silver nanoparticles was evaluated by grain size distribution measurement (trade name: Zeta Nanosizer, manufactured by Malvern Instruments Ltd.) according to the dynamic light scattering method, to find that the nanoparticles had an average grain size of 45 nm and a maximum particle diameter of 100 nm or less.

In this manner, silver nanoparticles provided with lauric acid on the surface thereof were obtained. They are the second metal nanoparticles provided with a low-molecular compound on their surfaces. Also, at least a part of the low-molecular compound was confirmed to be hexylamine as a primary amine by infrared (IR) spectroscopic analysis. The existential amount of the low-molecular compound with which the nanoparticles were coated was measured from the decomposition temperature by thermobalance, to find that this hexylamine occupied about 40% of the total mass of the low-molecular compound on the surface of the silver nanoparticles.

To 20 g of the first metal nanoparticle dispersion obtained in the above manner, 1 g of the second metal nanoparticles was mixed. The mixture was simply stirred by a rolling mill and then dispersed by an ultrasonic dispersing machine to produce a metal nanoparticle dispersion of Example 1.

The average particle diameter (average dispersion diameter) of the metal nanoparticles in the metal nanoparticle dispersion was measured by the aforementioned light scattering method just after the metal nanoparticles were dispersed. As a result, the average particle diameter of the metal nanoparticle dispersion just after the metal nanoparticles were dispersed was 43 nm.

The metal nanoparticle dispersion was allowed to stand in a 65° C. atmosphere to observe whether or not the particles were precipitated. After 9 days passed, the average particle diameter (average dispersion diameter) of the metal nanoparticles in the metal nanoparticle dispersion was measured in the same manner as in the case of the nanoparticles collected just after these nanoparticles were dispersed, to find that it was 60 nm. It was also confirmed that the maximum particle diameter of the metal nanoparticles after the dispersion was allowed to stand at 65° C. for 9 days was less than 150 nm.

Then, the obtained metal nanoparticle dispersion was used to form a conductive film to examine the characteristics of the film. A silicon wafer formed with a polyimide film was prepared and the above metal nanoparticle dispersion was applied to the silicon wafer by the spin coating method at a coating speed of 1,000 rpm/60 s. The coated film of the metal nanoparticle dispersion was raised at a rate of 150° C./60 s to dry the film to thereby produce the metal nanoparticle dispersion film.

The obtained metal nanoparticle dispersion film was heated at 200° C. for 60 minutes in a foaming gas (nitrogen/oxygen=97/3). The dispersion was baked at 250° C. for 30 minutes in a hydrogen stream to form a conductive film. The obtained conductive film was cut into a predetermined size (1 cm long×2 cm wide) to measure the volume resistivity by the four-terminal method, to find that the volume resistivity was 5.9 µΩ·cm.

Example 2

Copper nanoparticles (Nisshin Engineering Co., Ltd.) were prepared as first metal nanoparticles. The copper nanoparticles were measured by SEM, to find that it had a primary particle diameter of 50 nm and a BET specific surface area of 16 m$^2$/g.

The same polyvinyl pyrrolidone (weight average molecular weight: 50,000) as that used in Example 1 was prepared as the high-molecular compound. A dispersion of first metal nanoparticles provided with the high-molecular compound on their surfaces was obtained in the same manner as in Example 1 except that the amount of the high-molecular compound was altered to 1 g.

A metal nanoparticle dispersion of Example 2 was obtained in the same manner as in Example 1 except that the first metal nanoparticle dispersion obtained in this manner was used.

Example 3

A polyethylene glycol (weight average molecular weight: 1500) was prepared as the high-molecular compound. A dispersion of first metal nanoparticles provided with the high-molecular compound on their surfaces was obtained in the same manner as in Example 2 except that this high-molecular compound was used.

A metal nanoparticle dispersion of Example 3 was obtained in the same manner as in Example 2 except that the first metal nanoparticle dispersion obtained in this manner was used.

Example 4

A gelatin compound (weight average molecular weight: 100,000) was prepared as the high-molecular compound. A dispersion of first metal nanoparticles provided with the high-molecular compound on their surfaces was obtained in the same manner as in Example 2 except that this high-molecular compound was used.

A metal nanoparticle dispersion of Example 4 was obtained in the same manner as in Example 2 except that the first metal nanoparticle dispersion obtained in this manner was used.

Example 5

Copper nanoparticles (Nisshin Engineering Co., Ltd.) containing 5 mass % of nickel were prepared as the first metal nanoparticles. A dispersion of first metal nanoparticles provided with the high-molecular compound on their surfaces was obtained in the same manner as in Example 1 except that the metal nanoparticles were used.

A metal nanoparticle dispersion of Example 5 was obtained in the same manner as in Example 1 except that the first metal nanoparticle dispersion obtained in this manner was used.

Example 6

Second metal nanoparticles provided with a low-molecular compound on their surfaces were obtained in the same manner as in Example 1 except that hexylamine as a primary amine was altered to hexadecylamine. In this case, the boiling point of the hexadecylamine was about 330° C. The yield of the silver nanoparticles in this case was 48%. Also, it was confirmed that at least a part of the low-molecular compound was hexadecylamine as a primary amine. This hexadecylamine occupied about 45% of the total mass of the low-molecular compound on the surface of the silver nanoparticles.

A metal nanoparticle dispersion of Example 6 was obtained in the same manner as in Example 1 except that the second metal nanoparticles obtained in this manner were used.

Comparative Example 1

A metal nanoparticle dispersion of Comparative Example 1 was produced in the same manner as in Example 1 except that the second metal nanoparticles provided with a low-molecular compound on their surfaces were not used. The metal nanoparticles contained in the metal nanoparticle dispersion of this Comparative Example were only silver nanoparticles (first metal nanoparticles) provided with the polyvinyl pyrrolidone as the high-molecular compound on their surfaces.

Comparative Example 2

A metal nanoparticle dispersion of Comparative Example 2 was produced in the same manner as in Example 2 except that the second metal nanoparticles provided with a low-molecular compound on their surfaces were not used. The metal nanoparticles contained in the metal nanoparticle dispersion of this Comparative Example were only copper nanoparticles (first metal nanoparticles) provided with the polyvinyl pyrrolidone as the high-molecular compound on their surfaces.

Comparative Example 3

A metal nanoparticle dispersion of Comparative Example 3 was produced in the same manner as in Example 6 except that the dispersion of the first metal nanoparticles provided with a high-molecular compound on their surfaces were not used. Specifically, 5 g of silver nanoparticles provided with a low-molecular compound on their surfaces were added in 10 ml of toluene. The mixture was simply stirred by using a roll mill and then dispersed by an ultrasonic homogenizer to obtain a dispersion. The condition of the ultrasonic wave was as follows: frequency is 20 kHz, and power is about 3 W.

The metal nanoparticles contained in the metal nanoparticle dispersion of this Comparative Example are only silver nanoparticles (second metal nanoparticles) provided with hexadecylamine as a primary amine and lauric acid as a low-molecular compound on their surfaces.

Comparative Example 4

Sodium laurate and silver nitrate were mixed in equivalent amounts to synthesize silver laurate by ion exchange. The obtained silver laurate (30 g) was added in 1-octanol (300 ml), and the temperature of the solution was raised to 180° C. in a nitrogen atmosphere and kept at this temperature for 5 hours. When the temperature of the reaction solution was dropped to 60° C., the production of the silver nanoparticles was confirmed. Methanol (500 mL) was added to the solution to coagulate silver nanoparticles, which were then collected by suction filtration.

The yield of the silver nanoparticles was 33%. Also, the silver nanoparticles were observed by SEM, to find that the primary particle diameter of the silver nanoparticles was about 15 nm. Silver nanoparticles provided with lauric acid as a low-molecular compound on their surfaces were obtained. No primary amine is contained in the low-molecular compound.

A metal nanoparticle dispersion of Comparative Example 4 was produced in the same manner as in Example 2 except that the produced silver nanoparticles were used as the second metal nanoparticles.

With regard to the metal nanoparticle dispersion of each of the Examples 2 to 6 and Comparative Examples 1 to 4, the average particle diameter and maximum particle diameter of the metal nanoparticles were measured in the same manner as in Example 1. Moreover, a conductive film was formed in the same method as in Example 1 to measure the volume resistivity of the conductive film. The obtained results are described together with the results of Example 1 in the following Tables 1 and 2.

TABLE 1

| | Average particle diameter just after dispersed (nm) | 65° C./9 days after | |
|---|---|---|---|
| | | Average particle diameter (nm) | Maximum particle diameter (nm) |
| Example 1 | 43 | 60 | <150 |
| Example 2 | 43 | 67 | <150 |
| Example 3 | 90 | 120 | <200 |
| Example 4 | 45 | 59 | <150 |
| Example 5 | 48 | 67 | <150 |
| Example 6 | 40 | 56 | <100 |
| Comparative Example 1 | 46 | 51 | <100 |
| Comparative Example 2 | 48 | 45 | <100 |
| Comparative Example 3 | 18 | 1520 | >2500 |
| Comparative Example 4 | 15 | >10000 | >10000 |

TABLE 2

| | Volume resistivity ($\mu\Omega \cdot cm$) |
|---|---|
| Example 1 | 5.9 |
| Example 2 | 7.6 |
| Example 3 | 7.5 |
| Example 4 | 8.4 |
| Example 5 | 10.1 |
| Example 6 | 19.8 |
| Comparative Example 1 | 116 |
| Comparative Example 2 | <1000 |
| Comparative Example 3 | 5.1 |
| Comparative Example 4 | 4.9 |

As shown in the above Table 1, the metal nanoparticles are satisfactorily dispersed in the metal nanoparticle dispersion of each of Examples 1 to 6 and are not significantly coagulated after they are allowed to stand in a high-temperature condition for 9 days. Because the maximum particle diameters are less than 200 nm, the metal nanoparticle dispersion of this example may be applied as an ink jet ink.

The volume of a liquid droplet discharged from the printer head of an ink jet printer is generally about 6 pl. This volume 6 pl constitutes a spherical liquid droplet having a diameter of about 22.5 µm. Therefore, the maximum particle diameter of a solid content such as particles contained in the ink jet ink is desired to be a maximum particle diameter of the submicron order. In the metal nanoparticle dispersion of the Examples, any particle having a maximum particle diameter of 200 nm or more is not observed, showing that particles are stably dispersed as shown in the above Table 1.

Also, as shown in the above Table 2, the conductive films produced in Examples 1 to 6 each exhibit satisfactory volume resistivity. The volume resistivity of the conductive film is usually desired to be less than 10 µΩ·cm to use the conductive film as metal wire. Examples 1 to 6 each have an appropriate volume resistivity. In Example 1 among these examples, a volume resistivity as low as 5.9 µΩ·cm is obtained.

Here, the grain size distribution of the metal nanoparticle dispersion of Example 1 was measured by Zeta Nanosizer (manufactured by Malvern Instruments Ltd.). The results are shown in FIG. 1. In FIG. 1, the ordinate represents the intensity. This is because the optical intensity shows a most actual distribution in the evaluation according to the dynamic light scattering method. The curve a shows the results obtained just after nanoparticles are dispersed. The curves b and c show the results obtained after the dispersion is allowed to stand at 65° C. for 5 days and 10 days respectively. Although the grain size distribution is slightly shifted to the large grain size side when the dispersion is allowed to stand at 65° C., this shift level is within an allowable range. Although the maximum particle diameter is increased by allowing the dispersion to stand at 65° C., this gives rise to no problem because the maximum particle diameter is 200 nm or less.

An SEM photograph of the surface of the conductive film formed in Example 2 is shown in FIG. 2. It is understood that no crack is generated and a better film is therefore obtained.

In the Examples, the first metal nanoparticles provided with the high-molecular compound on their surfaces and the second metal nanoparticles provided with the low-molecular compound on their surfaces are contained and therefore, the metal nanoparticle dispersion in which particles are stably dispersed is obtained. Also, the use of the metal nanoparticle dispersion enables the formation of a film having high conductivity.

In the Comparative Examples, on the other hand, the dispersing stability of particles in the dispersion and the conductivity of the obtained film are incompatible with each other.

In the case of Comparative Example 1 containing only silver nanoparticles (first metal nanoparticles) provided with the high-molecular compound on their surfaces, the volume resistance of the conductive film obtained after the conductive film is baked is 116 µΩ·cm. In Comparative Example 1, no conductive film having desired conductivity can be formed. From this fact, it is found that a dispersion which does not contain the metal nanoparticles (second metal nanoparticles) provided with the low-molecular compound on their surfaces can be formed unsatisfactorily.

In the case of Comparative Example 2 containing only the copper nanoparticles (first metal nanoparticles) provided with the high-molecular compound on their surfaces, the volume resistivity of the conductive film after the conductive film is baked is larger and reaches about 1,000 µΩ·cm. As compared with the silver nanoparticles used in Comparative Example 1, the copper nanoparticles used in Comparative Example 2 are oxidized more easily and therefore, the volumetric shrinkage of the conductive film is larger.

Figure 3:
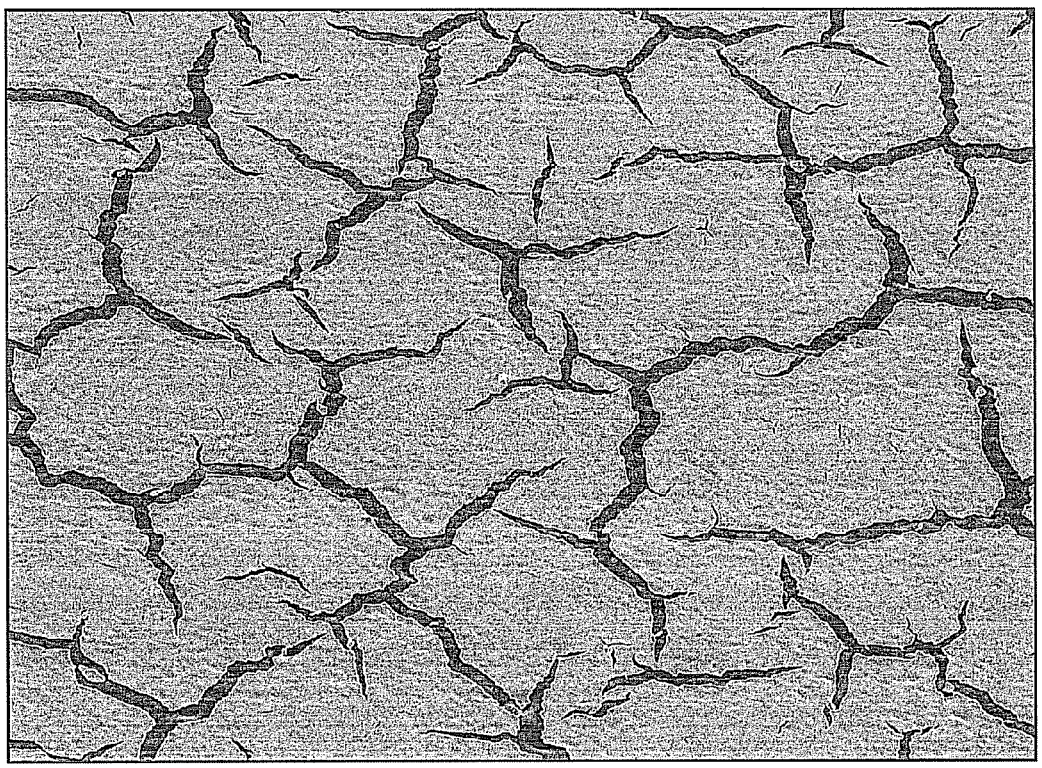
FIG. 3 is an SEM photograph of a conductive film formed using metal nanoparticle dispersion of a comparative example.

An SEM photograph of the surface of the conductive film formed in Comparative Example 2 is shown in FIG. 3. Cracks are significantly generated and it is clear that the volume resistance is thereby significantly increased.

In Comparative Example 3 in which only the silver nanoparticles (second metal nanoparticles) provided with the low-molecular compound on their surfaces are dispersed in toluene, the nanoparticles are coagulated by allowing the dispersion to stand at high temperature and the average particles diameter of the silver nanoparticles is increased to 1520 nm. In the metal nanoparticle dispersion of Comparative Example 3, hexadecylamine as a primary amine is contained in the low-molecular compound on the surface of the silver nanoparticles. However, since the metal nanoparticles (first metal nanoparticles) provided with the high-molecular compound on their surfaces are not contained, the nanoparticles cannot be stably dispersed in the dispersion of Comparative Example 3.

In Comparative Example 4, the coagulation of the nanoparticles obtained after the dispersion is allowed to stand at high temperature is more significant. In the dispersion of Comparative Example 4, the metal nanoparticles (second metal nanoparticles) provided with the low-molecular compound on their surfaces are contained together with the metal nanoparticles (first metal nanoparticles) provided with the high-molecular compound on their surfaces. However, in the second metal nanoparticles, no primary amine exists in the low-molecular compound. It is understood that this is the reason why the dispersing stability of the nanoparticles cannot be secured in the dispersion after the dispersion is allowed to stand at high temperature.

The metal nanoparticle dispersions of the Examples are preferably used as an ink jet ink. Using an ink jet head (trade name: CB1, manufactured by Toshiba Tec Corporation), the metal nanoparticle dispersion of Example 2 was printed on a polyimide substrate. The discharge of the metal nanoparticle dispersion from the head was stably continued after 1 hour or more passed and clogging of the head and the like were not observed.

The coated film of the metal nanoparticle dispersion was baked to obtain metal wire. The baking was carried out in a kiln under a controlled gas atmosphere.

Figure 4:
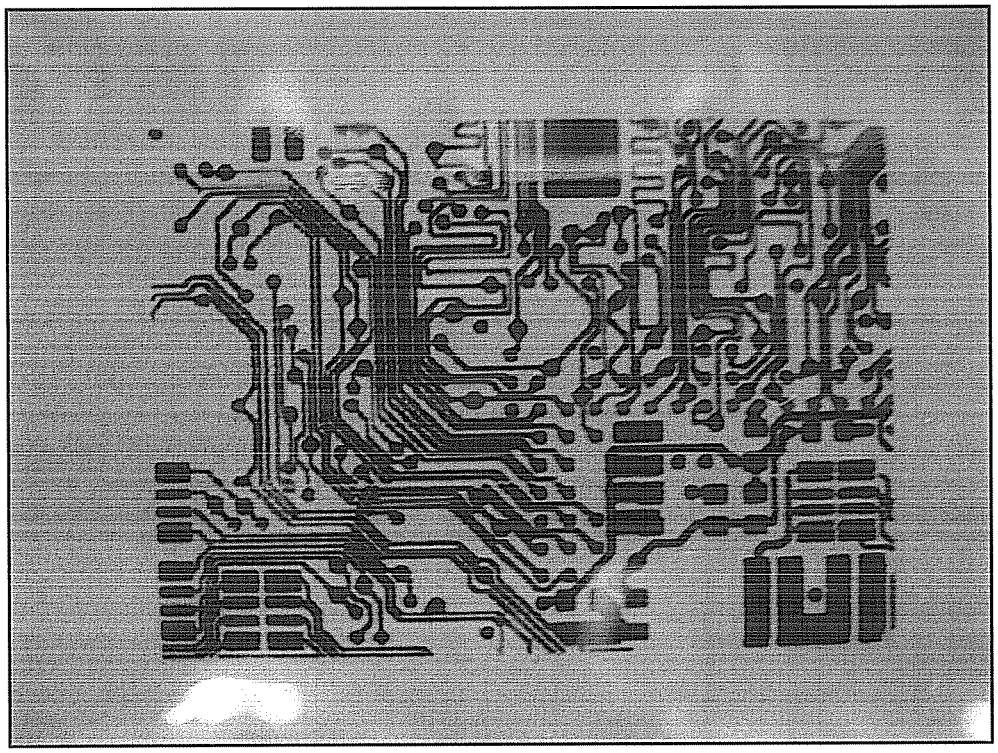
FIG. 4 is a microphotograph showing a metal wire formed using metal nanoparticle dispersion of an example.

The state of the obtained metal wire is shown in a microphotograph of FIG. 4. It is confirmed from FIG. 4 that the metal wire was printed with high accuracy.

The metal nanoparticle dispersion in each Example is stably dispersed in an organic solvent so that a film is obtained which can keep stable dispersibility even after the dispersion is allowed to stand at a high-temperature atmosphere and has high conductivity after the dispersion is baked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A metal nanoparticle dispersion comprising:
organic solvent; and
metal-containing particles dispersed in the organic solvent, the metal-containing particles comprising first metal nanoparticles and second metal nanoparticles, the second metal nanoparticles comprising a noble metal as a major component, each of the first metal nanoparticles having a high-molecular compound on at least part of a surface thereof, each of the second metal nanoparticles having a low-molecular compound on at least part of a surface thereof, a total amount of the low-molecular compound on all of the second nanoparticles containing an amount of a primary amine as the low-molecular compound, the high molecular compound having a weight average molecular weight range of 3,000 to 100,000, the low-molecular compound having a molecular weight of 100 to 300.

2. The dispersion according to claim 1, wherein the first metal nanoparticles are nanoparticles comprising at least one selected from the group consisting of copper, silver, gold, iron, platinum, palladium, tin, nickel, cobalt, ruthenium and rhodium.

3. The dispersion according to claim 2, wherein the first metal nanoparticles comprise copper as a major component.

4. The dispersion according to claim 1, wherein the high-molecular compound comprises a functional group or an atom which participates in the adsorption to the first metal nanoparticles.

5. The dispersion according to claim 1, wherein the noble metal comprises silver.

6. The dispersion according to claim 1, wherein the low-molecular compound comprises a functional group or an atom which interacts with the second metal nanoparticles.

7. The dispersion according to claim 1, wherein the primary amine has a boiling point of 250° C. or less.

8. The dispersion according to claim 1, wherein the first metal nanoparticles and the second metal nanoparticles respectively have an average primary particle diameter of 10 to 100 nm.

9. The dispersion according to claim 1, wherein the first metal nanoparticles and the second metal nanoparticles respectively have a maximum particle diameter of 500 nm or less.

10. The dispersion according to claim 1, wherein the organic solvent has 8 to 18 carbons.

11. The dispersion according to claim 1, wherein the metal-containing particles account for 4 to 70 mass % of the metal nanoparticle dispersion composition.

12. The dispersion according to claim 1, wherein the amount of the second metal nanoparticles is 0.1 to 30% of the amount of the first metal nanoparticles.

13. The dispersion according to claim 1, wherein the dispersion is an ink.

14. The dispersion according to claim 13, wherein the ink is an ink for ink jet printing.

15. The dispersion according to claim 1, wherein the high-molecular compound comprises polyvinyl type compound.

16. The dispersion according to claim 15, wherein the high-molecular compound comprises polyvinyl type compound which is selected from the group consisting of polyvinyl alcohol and polyvinyl pyrrolidone.

* * * * *